United States Patent [19]

Nickles et al.

[11] Patent Number: 4,735,385

[45] Date of Patent: Apr. 5, 1988

[54] APPARATUS AND METHOD FOR CONSERVING FUEL DURING DYNAMIC BRAKING OF LOCOMOTIVES

[75] Inventors: Stephen K. Nickles; John E. Haley; Michael J. Lynch, all of Duncan, Okla.

[73] Assignee: Halliburton Company, Duncan, Okla.

[21] Appl. No.: 65,993

[22] Filed: Jun. 24, 1987

[51] Int. Cl.$^4$ ................................................ B61C 5/00
[52] U.S. Cl. ................................ 246/182 B; 105/62.1
[58] Field of Search ........... 246/167 R, 182 R, 182 B, 246/182 A; 105/26 R, 62.1; 303/3, 20; 188/158, 159

[56] References Cited

U.S. PATENT DOCUMENTS

| | | | |
|---|---|---|---|
| 4,253,399 | 3/1981 | Spigarelli | 105/62.1 |
| 4,344,364 | 8/1982 | Nickles et al. | 105/62 R |
| 4,692,867 | 9/1987 | Poole | 303/3 X |

Primary Examiner—A. Michael Chambers
Assistant Examiner—John C. Fox
Attorney, Agent, or Firm—James R. Duzan; E. Harrison Gilbert III

[57] ABSTRACT

A respective microcomputer-based dynamic braking proportioning unit is disposed on each locomotive of a group of locomotives of a train consist. Each unit is connected to the brake setup and brake control wires of a trainline communicating with all of the locomotives, and each unit is connected to the dynamic braking equipment of its respective locomotive. Each unit includes two data entry mechanisms, such as switches, by which the respective microcomputer is advised of the total number of locomotives and of a unique number identifying the respective locomotive within the group. From the two signals from the trainline and the total locomotive and unique locomotive identification data, the respective microcomputer determines and outputs appropriate dynamic brake equipment control signals for the respective locomotive. These control signals are generated so that not all of the locomotives necessarily need to be placed in a dynamic braking mode for all levels of total dynamic braking required, thereby allowing any unneeded locomotive to be operated at a lower fuel consuming power level.

9 Claims, 2 Drawing Sheets

TOTAL
DYNAMIC
BRAKING
NEEDED
(%)
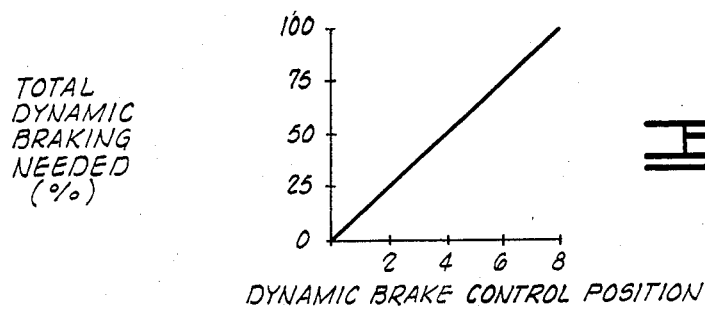
DYNAMIC BRAKE CONTROL POSITION
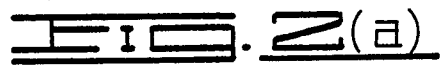
DYNAMIC
BRAKING
FROM
LOCOMOTIVE
1 (%)
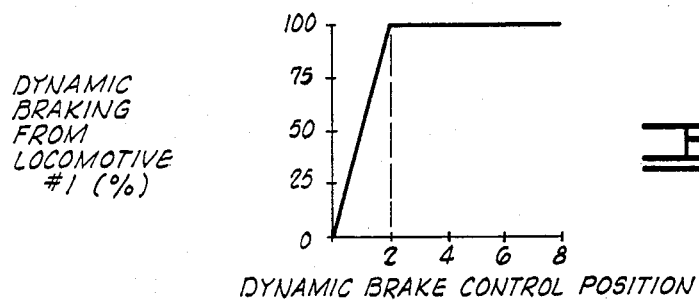
DYNAMIC BRAKE CONTROL POSITION
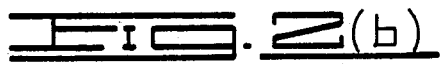
DYNAMIC
BRAKING
FROM
LOCOMOTIVE
2 (%)
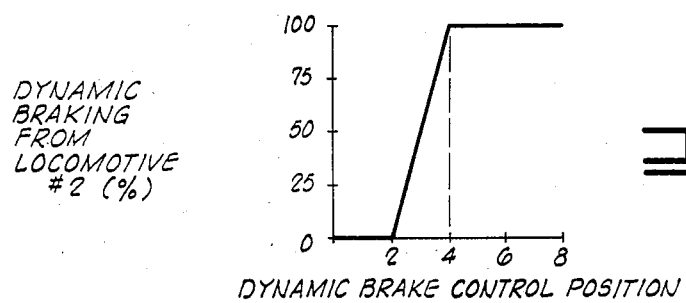
DYNAMIC BRAKE CONTROL POSITION
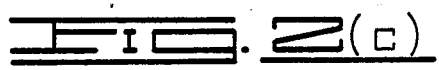
DYNAMIC
BRAKING
FROM
LOCOMOTIVE
3 (%)
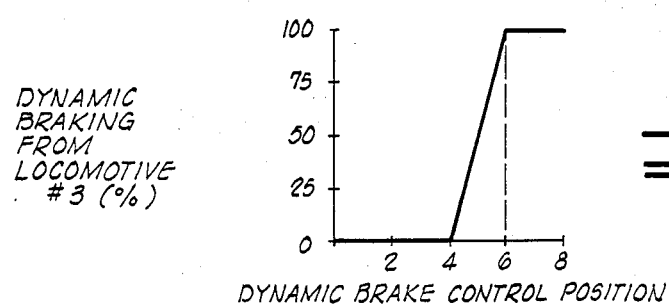
DYNAMIC BRAKE CONTROL POSITION
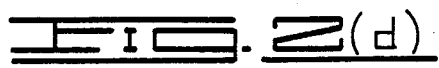
DYNAMIC
BRAKING
FROM
LOCOMOTIVE
4 (%)
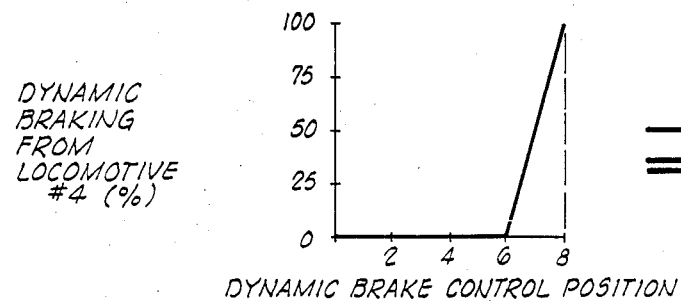
DYNAMIC BRAKE CONTROL POSITION
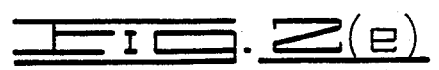

APPARATUS AND METHOD FOR CONSERVING FUEL DURING DYNAMIC BRAKING OF LOCOMOTIVES

BACKGROUND OF THE INVENTION

This invention relates generally to an apparatus and a method for conserving fuel during dynamic braking of locomotives (i.e., for operating the locomotives so that less fuel is used than would be used by heretofore conventional controlled dynamic braking). The invention relates more particularly, but not by way of limitation, to such apparatus and method utilizing a respective dynamic braking proportioning unit on each diesel locomotive of a train consist.

In the railroad industry attention has been given to ways of conserving fuel during the operation of trains because, for example, of the money that can be saved when fuel is saved. This attention to fuel conservation has been directed, at least in part, to ways of operating in more fuel efficient manners the locomotive propulsion or driving mechanisms which drive electrical traction motors to which the locomotive wheels are connected. That is, this focus has been on controlling the operation of the engines, such as through throttle setting control. Examples of this focus are disclosed in U.S. Pat. No. 4,344,364 to Nickles et al. and the references cited therein.

Another focus of this attention to fuel conservation would be on how to obtain fuel conservation from control of the locomotive stopping or braking mechanisms. Many conventional diesel locomotives are equipped with dynamic braking systems. A principle behind these dynamic braking systems is the utilization of the electrical traction motors as electrical generators to generate electrical power in response to the mechanical rotation imparted by the turning locomotive wheels connected to the traction motors, which generated power is dissipated within a large resistance grid located within the locomotive so that the dissipation causes a retarding force to act against the turning locomotive wheels.

These dynamic braking systems are designed to consume a substantial amount of power, such as up to 3000 horsepower. This creates a great deal of heat within the resistance grid. To maintain the resistance grid of a locomotive at an acceptable temperature level, cooling fans mounted on the locomotive are used. These fans are operated by the diesel engine(s) of the locomotive; therefore, fuel must be consumed during dynamic braking to power and the engine(s) to drive the fans. A typical fuel consumption rate per locomotive is 25 gallons per hour during dynamic braking as compared to a fuel consumption rate of 5 gallons per hour during locomotive idling. This difference in fuel consumption is especially significant because a typical train consist has more than one locomotive so that the consumption differential is multiplied by the number of locomotives in dynamic braking, which is the total number of locomotives for any level of conventional dynamic braking.

In such a typical train consist wherein more than one diesel locomotive is used to provide propulsion and braking for the train consist, the locomotives are mechanically and electrically coupled together. The electrical connection includes a trainline comprising several electrical conductors along which control signals are sent from the controlling locomotive at the command of the engineer. With respect to dynamic braking, it is controlled through a lever at the engineer's control stand. When the engineer moves this lever into a dynamic braking position, two of the wires within the electrical trainline are energized. In conventional dynamic braking operation, the signals along these two wires are provided in common to all of the coupled locomotives to obtain similar dynamic braking from each locomotive. Thus, all of the locomotives operate at the higher dynamic braking, fuel consumption rate regardless of how much braking is needed.

As is known to the art, one of the wires energized during dynamic braking is designated "B" and is referred to as the brake setup line. The other wire is given the letter designation "BC" and is referred to as the brake control line. When the dynamic braking lever is moved into its initial position, the B wire is immediately energized to the 74VDC level, which is the maximum voltage used on the conventional trainline known to the art. When a locomotive receives this signal, all the engines of the locomotive respond to increasing from idle speed to braking speed for driving the cooling fans (as knwon to the art, the engines are first disconnected from the alternators which drive the traction motors). The BC wire is a proportional signal, derived from the amount of movement of the engineer's dynamic braking control lever; it ranges from 0VDC (no braking) to 74VDC (full dynamic braking) for a conventional trainline.

To illustrate the effect of conventional dynamic braking, a train consist powered by four diesel locomotives is used as an example. It is assumed that each locomotive is capable of consuming 3,000 horsepower during dynamic braking, and that each locomotive consumes 5 gallons per hour when its engines are idling and 25 gallons per hour when they are driving the cooling fans during dynamic braking. Under these assumptions and the foregoing type of operation, a total of 100 gallons per hour would be consumed by the four locomotives under all dynamic braking conditions once the B wire has been energized to indicate dynamic braking (i.e., B=74VDC). This consumption rate is irrespective of what the BC signal is. This is shown in the following table:

TABLE I

| Lever Position | Volts B | Volts BC | Individual Braking Horsepower Consumption by Locomotive Number | | | | GPH Total |
|---|---|---|---|---|---|---|---|
| | | | 1 | 2 | 3 | 4 | |
| Idle | 0 | 0 | 0 | 0 | 0 | 0 | 20 |
| 0% | 74 | 0 | 0 | 0 | 0 | 0 | 100 |
| 25% | 74 | 18.5 | 750 | 750 | 750 | 750 | 100 |
| 50% | 74 | 37.0 | 1500 | 1500 | 1500 | 1500 | 100 |
| 75% | 74 | 55.5 | 2250 | 2250 | 2250 | 2250 | 100 |
| 100% | 74 | 74.0 | 3000 | 3000 | 3000 | 3000 | 100 |

In view of the foregoing, there is the need for a more efficient way of operating the locomotives during dynamic braking so that the maximum fuel consumption is not used at all levels of dynamic braking.

SUMMARY OF THE INVENTION

The present invention overcomes the above-noted and other shortcomings of the prior art by providing a novel and improved apparatus and a novel and improved method for conserving fuel during dynamic braking of locomotives. The present invention allows a locomotive within a train consist to operate at a less fuel consuming power level until dynamic braking is needed from that locomotive.

The apparatus of the present invention is useful in a train consist including a plurality of locomotives, each of which locomotives comprises dynamic braking means for dynamically braking the respective locomotive and through all of which locomotives a common electrical trainline is connected so that a master brake control signal, defining a total required dynamic braking within a range between no dynamic braking and full dynamic braking, is provided over the trainline to each locomotive when the train consist is to be dynamically braked. This apparatus comprises: means, responsive to the master brake control signal, for determining which of the dynamic braking means of the locomotives are to be actuated in response to the master brake control signal; means, responsive to the means for determining, for defining a portion of the total required dynamic braking to be provided by each of the dynamic braking means which are to be actuated; and means, responsive to the means for defining, for providing to each dynamic braking means which is to be actuated a respective slave brake control signal defining to the respective dynamic braking means the respective portion of the total required dynamic braking to be provided thereby.

The method of the present invention has utility within the aforementioned environment, which more specifically includes both the brake setup signal, B (having a magnitude similarly designated), and the brake control signal, BC (having a magnitude similarly designated), of a 74-volt trainline. This method comprises: assigning to each locomotive a respective unique number, X; specifiying to each locomotive the total number, Y, of locomotives within the plurality of locomotives; and performing the following steps independently in each locomotive: converting the brake control signal into a respective output control signal, having a magnitude $BC'$, for controlling the dynamic braking means of the respective locomotive, the converting including: determining whether $B=74$ and whether $BC>74(X-1)/Y$ for the respective locomotive; and generating the output control signal if $B=74$ and $BC<74(X-1)/Y$ for the respective locomotive, wherein the output control signal has a magnitude: $BC'=[BC-(74(X-1)/Y)]Y$, if $0<[BC-(74(X-1)/Y)]Y \leq 74$, or $BC'=74$, if $[BC-(74(X-1)/Y)]Y>74$; and communicating $BC'$ to the dynamic braking means of the respective locomotive.

The step of performing the following steps independently in each locomotive further includes: detecting whether $B=0$ or $B=74$; generating a second output control signal with a voltage $B'=74$ if $B=74$ and $BC>74(X-1)/Y$ for the respective locomotive; generating $B'=0$ if $B=0$ or $BC \leq 74(X-1)/Y$; and communicating $B'$ to the dynamic braking means of the respective locomotive.

Therefore, from the foregoing, it is a general object of the present invention to provide a novel and improved apparatus and a novel and improved method for conserving fuel during dynamic braking of locomotives. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 2(a)-2(e) are graphs showing the total dynamic braking needed [FIG. 2(a)] and the dynamic braking obtained from each locomotive throughout the full range of operation of the dynamic brake control lever [FIGS. 2(b)-(j)].

DETAILED DESCRIPTION OF THE PREFERRED EMBODIMENT

Figure 1:
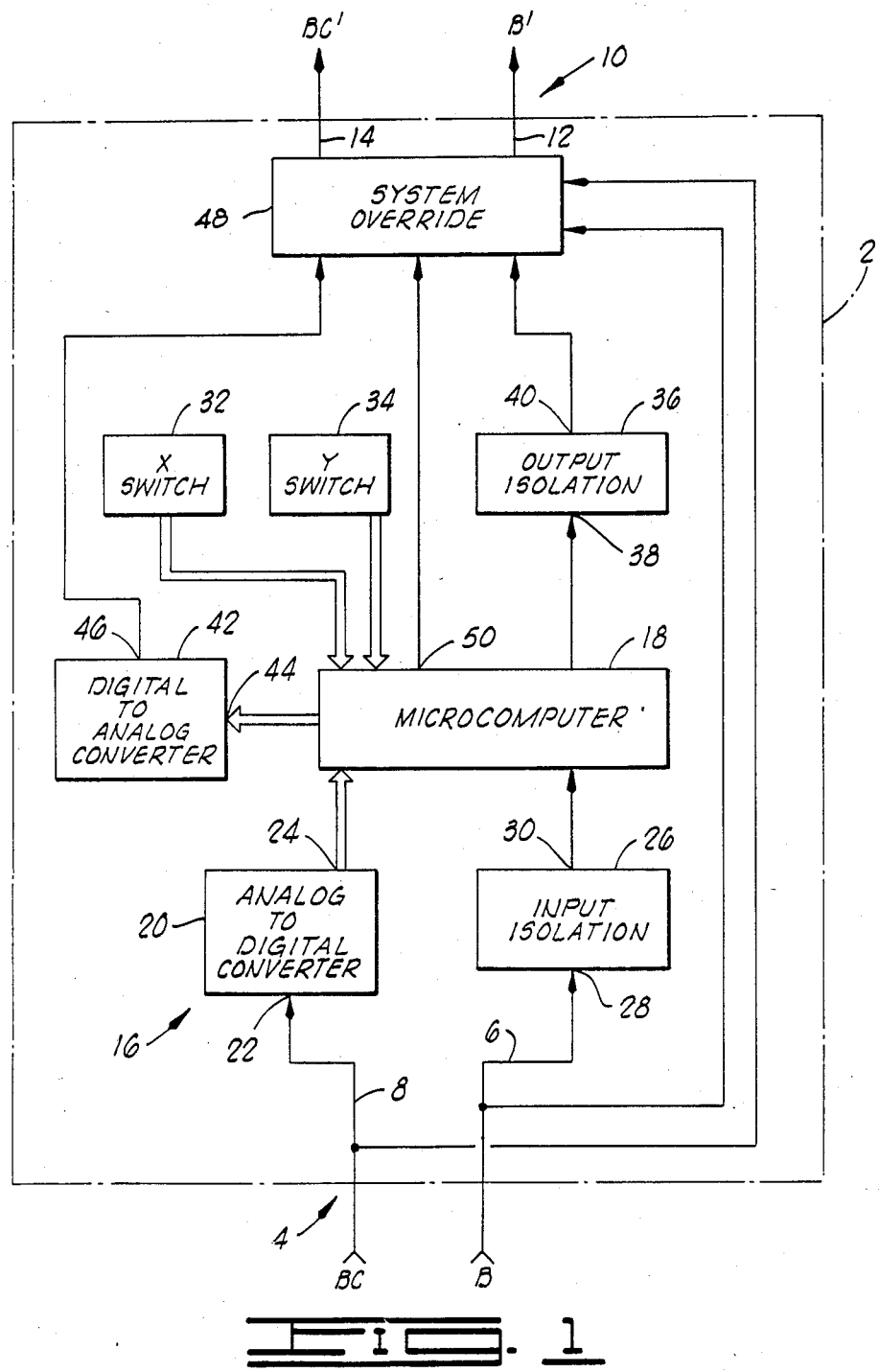
FIG. 1 is a block diagram of the preferred embodiment of the apparatus of the present invention.

For conventional diesel locomotives mechanically connected within a train consist, a trainline comprising a plurality of electrically conductive wires is established throughout the locomotives. The conventional trainline carries direct current voltage signals, having voltage magnitudes between 0VDC (the minimum trainline voltage) and 74VDC (the maximum trainline voltage), to the locomotives for various control or informational purposes.

Two wires of the conventional trainline are used to control the dynamic braking of the locomotives. The brake set-up wire or line carries the brake setup signal (this wire, its signal and the magnitude thereof are all designated by the letter "B"). The standard B signal is an on/off signal designating whether the train is or is not in a dynamic braking mode. Specifically, $B=74VDC=B_{max}=$on/dynamic braking mode; $B=0VDC=B_{min}=$off/non-dynamic braking mode). The brake control wire or line carries the brake control signal (this wire, its signal and the magnitude thereof are all designated by the letter group "BC"). The standard BC signal has a voltage variable within a range between $0VDC=BC_{min}$ (no dynamic braking) and $74VDC=BC_{max}$ (full dynamic braking) to designate the total required amount of dynamic braking. There two wires and how they control the conventional dynamic braking of a conventional diesel locomotive are known to the art.

To obtain the fuel conservation advantages of the present invention, the conventional B and BC signals communicated over the trainline to all of the locomotives of a train consist are interrupted and replaced in each locomotive by a respective set of two slave control signal (sometimes referred to herein as the $B'$ and $BC'$ signals, respectively). Because two slave control signals are generated within each locomotive for use only by that locomotive, the magnitudes of these signals can differ from locomotive to locomotive even though all the locomotives of the train consist receive the identical master B and BC signals. This is achieved in the preferred embodiment apparatus of the present invention by means of individual dynamic braking proportioning units, each of which is disposed on a respective locomotive. Each unit is connected electrically to the B and BC wires of the common trainline and to the conventional B and BC inputs of the dynamic braking means of the respective locomotive, which dynamic braking means provides the dynamic braking for the respective locomotive and is of a type known to the art. Thus, each of these units receives the "master" B and BC signals from the common trainline and, in response thereto, provides the respective "slave" $B'$ and $BC'$ signals.

Broadly, the apparatus of the present invention includes means, responsive to the master brake control signal, for determining which of the dynamic braking means of the locomotives within the train consist are to be actuated in response to the master brake control signal; means, responsive to the means for determining, for defining a portion of the total required dynamic braking to be provided by each of the dynamic braking means which are to be actuated; and means, responsive to the means for defining, for providing to each dynamic braking means which is to be actuated a respective slave brake control signal defining to the respective dynamic braking means the respective portion of the total required dynamic braking to be provided thereby. These means are provided by the dynamic braking proportion units.

Each of the dynamic braking proportioning units includes: input means for receiving the brake setup signal and the brake control signal communicated to the respective locomotive; control means, connected to the input means, for computing in response to the brake setup signal and the brake control signal the portion, if any, of the total required dynamic braking to be provided by the respective locomotive and for generating an output control signal in response thereof; and output means, connected to the control means, for communicating to the dynamic braking means of the respective locomotive the output control signal so that the dynamic braking means of the respective locomotive provides the computed portion, if any, of the total required dynamic braking. The preferred embodiment of the input means, the output means, and the control means will be described with reference to FIG. 1, wherein one dynamic braking proportioning unit is generally identified by the reference numeral 2.

The input means is generally identified in FIG. 1 by the reference numeral 4. The input means 4 includes the wires and any connection devices, or other conductor means, by which the conventional B and BC lines of the trainline are connected to the unit 2. As illustrated in FIG. 1, the master B signal is input through a conductor 6, and the master BC signal is input through a conductor 8.

The output means is generally identified in FIG. 1 by the reference numeral 10. The output means 10 includes the wires and any connection devices, or other conductor means, by which the dynamic braking means of the respective locomotive is connected to the unit 2. As illustrated in FIG. 1, the slave B' signal is output to the respective dynamic braking means through a conductor 12, and the slave BC' signal is output to the respective dynamic braking means through a conductor 14.

The control means, generally identified by the reference numeral 16 for the preferred embodiment shown in FIG. 1, implements the fuel conserving concept of the present invention whereby a locomotive is left to operate at a lower power level, and thus a lower fuel consumption rate, until its dynamic braking is needed. This is achieved in the following manner.

Each locomotive is assigned a respective unique number, X, which defines a relative position of the respective locomotive within the plurality of locomotives. The total number, Y, of locomotives is also specified. In the preferred embodiment, X is a whole number and $0 < X \leq Y$. For a train consist which includes four locomotives, for example, the head locomotive would have $X=1$ and $Y=4$, the next locomotive would have $X=2$ and $Y=4$, the next locomotive would have $X=3$ and $Y=4$, and the last locomotive would have $X=4$ and $Y=4$.

In each locomotive the common master BC signal is converted into the respective output control signal, BC', for controlling the dynamic braking means of the respective locomotive based on the following logic for the preferred embodiment.

EVENT 1

If:
(1) B=74VDC (i.e., B=dynamic mode operation, which is $B_{max}$ in the preferred embodiment) and
(2) BC>74(X−1)/Y for the respective locomotive and its value of X [i.e., $BC \leq BC_{max}(X-1)/Y$ for the preferred embodiment], then:
(3) B'=74VDC and
(4) BC'=[BC−(74(X−1)/Y)]Y VDC for the respective locomotive and its value of X;

provided, however, that if from equation (4) BC'>74, then BC' is set equal to 74VDC for that locomotive.

EVENT 2

If:
(5) B=74VDC and
(6) BC≦74(X−1)/Y for the respective locomotive and its value of X, then:
(7) B'=0VDC and
(8) BC'=0VDC.

EVENT 3

If:
(9) B=0VDC, then:
(10) B'=0VDC and
(11) BC'=BC.

If Event 1 exists with respect to any particular locomotive, the unit 2 generates B' and BC' as defined by equations (3) and (4), thereby providing dynamic braking to the train consist from that particular locomotive.

The existence of Event 2 with respect to any particular locomotive means that no dynamic braking is needed from that locomotive for that particular setting of the master brake control signal; therefore, both the B' and BC' signals are set at 0VDC to prevent the locomotive from entering the dynamic braking mode wherein fuel would be consumed at a higher rate. Thus, although the master B and BC signals call for dynamic braking, a locomotive coming within Event 2 is left to operate at a lower engine speed.

The existence of Event 3 means that the master brake setup signal is not indicating a dynamic braking mode; therefore, the B' signal would likewise be maintained at 0VDC, but the BC' signal would be allowed to track the BC signal which might be conveying other, non-dynamic braking information.

Referring to the example of four locomotives (wherein the dynamic braking fuel consumption rate is 25 gallons per hour and the non-dynamic braking fuel consumption rate is 5 gallons per hour), the following table shows how the four locomotives would provide dynamic braking in accordance with Events 1 and 2 (i.e., it is assumed that B=74VDC so that the trains consist is in a dynamic braking mode):

TABLE II

| Lever Position | Locomotive Number (X =) | | | | | | | | | | | | GPH | |
| --- | --- | --- | --- | --- | --- | --- | --- | --- | --- | --- | --- | --- | --- | --- |
| | 1 | | | 2 | | | 3 | | | 4 | | | | Saved vs. |
| | B' | BC' | HP | B' | BC' | HP | B' | BC' | HP | B' | BC' | HP | Total | Table I |
| 0% to 25% | 74 | 0–74 | 0–3000 | 0 | 0 | 0 | 0 | 0 | 0 | 0 | 0 | 0 | 40 | 60 |
| 25+% to 50% | 74 | 74 | 3000 | 74 | 0–74 | 0–3000 | 0 | 0 | 0 | 0 | 0 | 0 | 60 | 40 |
| 50+% to 75% | 74 | 74 | 3000 | 74 | 74 | 3000 | 74 | 0–74 | 0–3000 | 0 | 0 | 0 | 80 | 20 |
| 75+% to 100% | 74 | 74 | 3000 | 74 | 74 | 3000 | 74 | 74 | 3000 | 74 | 0–74 | 0–3000 | 100 | 0 |

The dynamic braking information of Table II is graphically shown in FIGS. 2(a)–2(e). These graphs and the table clearly show how, for a four locomotive group, only one of the locomotives is used to provide dynamic braking when only up to 25% of the maximum dynamic braking is needed. When up to 50% of the maximum dynamic braking is needed, a second locomotive is used. When up to 75% of the maximum is needed, a third locomotive is used along with the first two. Above 75%, all four locomotives are used. Therefore, until the fourth locomotive is placed in the dynamic braking mode (i.e., until B' for the fourth locomotive=74VDC), there is a net fuel saving from the dynamic braking control provided by the present invention as compared to the conventional dynamic braking operation such as is illustrated in Table I.

The foregoing logic is implemented in the preferred embodiment by conventional components which are identified in FIG. 1. These components include a microcomputer 18, which comprises suitable microprocessor and memory components of types as known to the art. Stored within a portion of the memory would be a program implementing the logic set forth hereinabove with reference to Events 1, 2 and 3; it is contemplated that such a program would be readily obtainable by those skilled in the art given the description of the invention set forth herein.

To obtain the master BC input for the microcomputer 18, the unit 2 includes a conventional analog-to-digital converter 20. The converter 20 comprises an input 22 connected to the conductor 8 for receiving the master BC signal. The converter 20 also comprises an output 24 connected to the microcomputer 18. The analog-to-digital converter 20 is, in the preferred embodiment, a type capable of handling 74 VDC inputs.

The logic level (i.e., no dynamic braking mode/dynamic braking mode) of the master B signal is communicated to the microcomputer 18 through a conventional binary input isolation device 26 of a type as known to the art for converting a 74VDC signal to a level compatible with the microcomputer 18. The input isolation device 26 comprises an input 28 connected to the conductor 6 and an output 30 connected to the microcomputer 18.

The unique relative locomotive position number, X, is input into the microcomputer 18 through a conventional switch 32, such as a single digit decade switch of a type as known to the art. Thus, the switch 32 provides means for communicating to the microcomputer 18 a respective number assigned to the respective locomotive.

The total locomotive number, Y, is input into the microcomputer 18 through a switch 34, such as a single digit decade switch of a type as known to the art. The switch 34 defines a means for communicating to the microcomputer 18 the total number of locomotives in the train consist.

Having the aforementioned inputs, the microcomputer, programmed in a manner as would be readily obtainable by those skilled in the pertinent arts to implement the logic described herein, performs the previously described logic to determine the required B' and BC' outputs for the respective locomotive. This microcomputer 18 with the specified input information thus provides means for determining whether the magnitude of the BC signal is greater than the mathematical product of the voltage magnitude of the master brake control signal representing full required dynamic braking (i.e., $BC_{max}=74$ in the preferred embodiment) multiplied by the quantity $[(X-1)/Y]$. This is mathematically expressed in equation (2), above. The microcomputer 19 with the specified input information also provides means for computing BC' in accordance with equation (4) and its proviso, above. More specifically, the microcomputer 18 with the specified input information provides means for generating both B' and BC' in accordance with equations (3) and (4), (7) and (8), and (10) and (11) for the respective events defined by equations (1) and (2), (5) and (6), and (9).

The B' signal is output through a conventional binary output isolation device 36 of a type as known to the art and capable of outputting 74VDC levels. The device 36 includes an input 38 connected to the microcomputer 18, and the device 36 includes an output 40 connected to the output means 10; therefore, the output isolation device 36 communicates the B' control signal to the output means 10. The B' control signal is in effect a binary logic value (i.e., on or off).

The BC' output signal is output through a conventional digital-to-analog converter 42 capable of producing 74VDC output levels. The converter 42 has an input 44 connected to the microcomputer 18, and the converter 42 has an output 46 through which the BC' signal is provided to the output means 10.

The output 40 of the output isolation device 36 and the output 46 of the digital-to-analog converter 42 are shown in FIG. 1 connected to respective inputs of a system override circuit 48. Also, one or more control signals through output 50 of the microcomputer 18 is/are provided to one or more respective inputs of the system override circuit 48 to control the operation of the circuit 48. The function of the circuit 48 is to connect the outputs 40, 46 to the output means 10, and thus to communicate the B' and BC' signals to the output means 10 under normal operating conditions when the master brake setup signal, B, indicates operation in the dynamic braking mode. If Event 3 occurs, or if the unit 2 detects an inappropriate state within itself, then the microcomputer 18 would control the circuit 48 to connect the master B and BC signals directly to the output means 10, thereby bypassing the control means 12 of the unit 2. In essence the circuit 48 would consist of suitable switching mechanisms, such as relays operable in response to one or more control signals from the microcomputer 18.

It is contemplated that the present invention could be implemented using the equipment shown in U.S. Pat. No. 4,344,364.

The preferred embodiment of the method of the present invention comprises methodological steps in accordance with the logic of Events 1, 2 and 3. The method more broadly comprehends controlling the operation of a group of locomotives so that not all of the locomotives need be used for all levels of dynamic braking that might be required, thereby conserving fuel at certain dynamic braking levels relative to what would be required at such levels by conventional dynamic braking operation.

From the foregoing, it is apparent that the system of the units 2, each of which is disposed in a respective locomotive of a group of locomotives forming at least part of a train consist, controls the locomotives so that individual locomotives may be left at a lower (e.g., idle) power level to reduce the fuel consumption of the overall groups of locomotives during certain levels of dynamic braking. Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An apparatus for conserving fuel during dynamic braking of a train consist including a plurality of locomotives, each of which locomotives comprises dynamic braking means for dynamically braking the respective locomotive and through all of the which locomotives a common electrical trainline is connected so that a master brake control signal, defining a total required dynamic braking within a range between no dynamic braking and full dynamic braking, is provided over the trainline to each locomotive when the train consist is to be dynamically braked, said apparatus comprising:

means, responsive to the master brake control signal, for determining which of the dynamic braking means of the locomotives are to be actuated in response to the master brake control signal;

means, responsive to said means for determining, for defining a portion of the total required dynamic braking to be provided by each of the dynamic braking means which are to be actuated; and means, responsive to said means for defining, for providing to each dynamic braking means which is to be actuated a respective slave brake control signal defining to the respective dynamic braking means the respective portion of the total requried dynamic braking to be provided thereby.

2. A system for conserving fuel during dynamic braking of a train consist including a plurality of locomotives, each of which locomotives comprises dynamic braking means for dynamically braking the respective locomotive and through all of which locomotives a brake setup signal and a brake control signal are communicated, which brake control signal defines a total required dynamic braking, said system comprising a plurality of dynamic braking proportioning units, each of said units disposed on a respective one of the locomotives and each of said units including:

input means for receiving the brake setup signal and the brake control signal communicated to the respective locomotive;

control means, connected to said input means, for computing in response to the brake setup signal and the brake control signal the portion, if any, of the total required dynamic braking to be provided by the respective locomotive and for generating an output control signal in response thereto; and output means, connected to said control means, for communicating to the dynamic braking means of the respective locomotive said output control signal so that the dynamic braking means of the respective locomotive provides the computed portion, if any, of the total required dynamic braking.

3. A system as defined in claim 2, wherein said control means includes:

means for specifying the total number, Y, of locomotives in the train consist;

means for assigning a unique whole number, X, to the respective locomotive, wherein $0 < X \leq Y$;

means for determining whether the brake control signal has a voltage magnitude, designated BC, which is greater than the mathematical product of the voltage magnitude of the brake control signal representing full required dynamic braking, designated $BC_{max}$, multiplied by the quantity $[(X-1)/Y]$; and means for computing a voltage magnitude, BC', for said output control signal equal to a mathematical quantity in response to the brake setup signal indicating a need for dynamic braking and in response to said BC being greater than said mathemtical product, said mathematical quantity including:

$[BC - (BC_{max}(X-1)/Y)](Y)$, provided, however, BC' is equated to $BC_{max}$ if said mathematical quantity is greater than $BC_{max}$.

4. A system as defined in claim 3, wherein said control means further includes means for generating a second output control signal, with a voltage magnitude B', in response to the brake setup signal and said means for determining whether $BC > (BC_{max})[X-1)/Y]$, wherein B' = a maximum brake setup signal voltage magnitude, $B_{max}$, if the brake setup signal has a voltage magnitude $B = B_{max}$ and $BC > (BC_{max})[(X-1)/Y]$, and B' = a minimum brake setup signal voltage magnitude, $B_{min}$, if $B = B_{min}$ or $BC \leq (BC_{max})[X-1)/Y]$.

5. A system as defined in claim 2, wherein said control means includes:

a microcomputer;

an analog-to-digital converter including an ADC input and ADC output, said ADC input connected to said input means so that the brake control signal is connected to said analog-to-digital converter, and said ADC output connected to said microcomputer; and a digital-to-analog converter including a DAC input and a DAC output, said DAC input connected to said microcomputer and said DAC output connected to said output means so that said output control signal is provided therethrough.

6. A system as defined in claim 5, wherein said control means further includes:

means for communicating to said microcomputer the total number of locomotives in the train consist; and means for communicating to said microcomputer a respective number assigned to the respective locomotive.

7. A system as defined in claim 6, wherein said control means further includes:
   input isolator means, connected to said input means and said microcomputer, for communicating to said microcomputer a logic value of the brake setup signal; and
   output isolator means, connected to said microcomputer and said output means, for communicating to said output means a second output control signal having a logic value determined in response to the brake setup signal and the brake control signal.

8. A method of conserving fuel during dynamic braking of a plurality of locomotives to which a brake setup signal, having a magnitude B, and a brake control signal, having a magnitude BC, of a 74-volt trainline are provided, each locomotive including respective dynamic braking means for dynamically braking the respective locomotive, said method comprising:
   assigning to each locomotive a respective unique number, X;
   specifying to each locomotive the total number, Y, of locomotives within the plurality of locomotives; and
   performing the following steps independently in each locomotive;
   converting the brake control signal into a respective output control signal, having a magnitude BC', for controlling the dynamic braking means of the respective locomotive, said converting including:
   determining whether $B=74$ and whether $BC>74(X-1)/Y$ for the respective locomotive; and
   generating said output control signal if $B=74$ and $BC \leqq 74(X-1)/Y$ for the respective locomotive, wherein said output control signal has a magnitude:
   $BC'=[BC-(74(X-1)/Y)]Y$, if $0<[BC-(74(X-1)/Y)]Y \leqq 74$, or
   $BC'=74$, if $[BC-(74(X-1)/Y)]Y>74$; and
   communicating BC' to the dynamic braking means of the respective locomotive.

9. A method as defined in claim 8, wherein said performing the following steps independently in each locomotive further includes:
   detecting whether $B=0$ or $B=74$:
   generating a second output control signal with a voltage $B'=74$ if $B=74$ and $BC>74(X-1)/Y$ for the respective locomotive;
   generating $B'=0$ if $B=0$ or $BC \leqq 74(X-1)/Y$; and
   communicating B' to the dynamic braking means of the respective locomotive.

* * * * *

UNITED STATES PATENT AND TRADEMARK OFFICE
CERTIFICATE OF CORRECTION

PATENT NO. : 4,735,385

DATED : April 5, 1988

INVENTOR(S) : Stephen K. Nickles et a.

It is certified that error appears in the above-identified patent and that said Letters Patent is hereby corrected as shown below:

In column 4, line 9, delete the phrase [Figs. 2(b) - ()] and insert therefor --[Figs. 2(b) - (e)]--.

In column 5, line 23, delete the word [thereof] and insert therefor --thereto--.

In column 8, line 25, delete the numeral [19] and insert therefor --18--.

Signed and Sealed this

Eleventh Day of October, 1988

*Attest:*

DONALD J. QUIGG

*Attesting Officer*   *Commissioner of Patents and Trademarks*